(12) United States Patent
Fujimori

(10) Patent No.: US 8,827,018 B2
(45) Date of Patent: Sep. 9, 2014

(54) WORK VEHICLE

(75) Inventor: Hiroyoshi Fujimori, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/882,755

(22) PCT Filed: Sep. 4, 2012

(86) PCT No.: PCT/JP2012/072494
§ 371 (c)(1),
(2), (4) Date: May 1, 2013

(87) PCT Pub. No.: WO2013/175646
PCT Pub. Date: Nov. 28, 2013

(65) Prior Publication Data
US 2014/0216833 A1    Aug. 7, 2014

(30) Foreign Application Priority Data

May 24, 2012    (JP) ................................ 2012-118722

(51) Int. Cl.
B60K 11/00    (2006.01)
B60K 11/06    (2006.01)
B60K 11/04    (2006.01)

(52) U.S. Cl.
CPC .............. *B60K 11/06* (2013.01); *B60K 11/04* (2013.01)
USPC ....................................................... 180/68.1

(58) Field of Classification Search
CPC ............................... B60K 11/00; B60K 11/06
USPC ............................................... 180/68.1–68.6
See application file for complete search history.

(56) References Cited

U.S. PATENT DOCUMENTS

| | | | | |
|---|---|---|---|---|
| 6,216,778 B1 * | 4/2001 | Corwin et al. | ................ | 165/299 |
| 8,347,994 B2 * | 1/2013 | Bering et al. | ................ | 180/68.3 |
| 8,403,089 B2 * | 3/2013 | Braun et al. | ................. | 180/68.1 |
| 8,453,776 B2 * | 6/2013 | Neilson | ........................ | 180/68.1 |
| 8,578,834 B2 * | 11/2013 | Tunis et al. | .................. | 89/36.02 |
| 8,616,317 B2 * | 12/2013 | Hoess | .......................... | 180/68.4 |

FOREIGN PATENT DOCUMENTS

| | | |
|---|---|---|
| JP | 11-123940 A | 5/1999 |
| JP | 2000-310119 A | 11/2000 |
| JP | 2000-352315 A | 12/2000 |
| JP | 2001-227343 A | 8/2001 |
| JP | 2001-336423 A | 12/2001 |
| JP | 2002-67707 A | 3/2002 |
| JP | 2006-316673 A | 11/2006 |
| JP | 2006-329014 A | 12/2006 |

* cited by examiner

*Primary Examiner* — John Walters
*Assistant Examiner* — James Triggs
(74) *Attorney, Agent, or Firm* — Global IP Counselors, LLP

(57) ABSTRACT

A first cooling device is disposed in an engine room at the upstream side in the air flow direction with respect to an engine. A second cooling device is disposed at the upstream side in the air flow direction with respect to the first cooling device. A third cooling device is disposed at the upstream side in the air flow direction with respect to the second cooling device. An air pipe connects the engine and the third cooling device. The air pipe passing above the first cooling device and the second cooling device. A blocking member closes off periphery of a space between the first cooling device and the second cooling device. The blocking member includes an opening. A cover member is configured to selectively open and close the opening.

18 Claims, 8 Drawing Sheets

WORK VEHICLE

CROSS-REFERENCE TO RELATED APPLICATIONS

This application claims priority to Japanese Patent Application No. 2012-118722 filed on May 24, 2012, the disclosure of which is hereby incorporated herein by reference in its entirety.

BACKGROUND

1. Technical Field

The present invention relates to a work vehicle.

2. Background Information

Typically, since a cooling device of a work vehicle is exposed to the flow of air in an engine room, it is easy for dust to become adhered. As a result, it is necessary to perform cleaning of the cooling device. For example, in a work vehicle which is disclosed in Japanese Unexamined Patent Application Publication No. H11-123940, an oil cooler, a radiator and a fan shroud are disposed to be separated at predetermined intervals. The oil cooler, the radiator, and the fan shroud are fixed to a frame with bolts. When cleaning the radiator and the oil cooler, an operator removes the bolts which fix the radiator and the oil cooler, and the radiator and the oil cooler are hoisted up by a crane. Then, after the radiator and the oil cooler have been removed from a vehicle body, cleaning of the radiator and the oil cooler is performed.

SUMMARY

In order to perform the cleaning of the cooling device as described above, the work during cleaning is complicated since the cooling device is removed from the vehicle body. In particular, when a pipe is disposed above the cooling device, it is necessary to remove the pipe and the work becomes even more complicated in a case where the cooling device is hoisted up and removed. In addition, there is a possibility that foreign matter penetrates inside air pipe due to air pipe being removed in a case where the pipe which is disposed above the cooling device is an air pipe which is connected to the engine. Foreign matter inside of the air pipe may become a cause of a reduction in engine performance.

The object of the present invention is to provide a work vehicle where it is possible for cleaning of a cooling device to be easily performed and it is possible for adverse effects on engine performance by cleaning work to be prevented.

A work vehicle according to a first aspect of the present invention is provided with a vehicle body, an engine, a first cooling device, a second cooling device, a third cooling device, an air pipe, a blocking member, and a cover member. The vehicle body includes an engine room. The engine is disposed inside the engine room. The first cooling device is disposed in the engine room at the upstream side in the air flow direction with regard to the engine. The second cooling device is disposed at the upstream side in the air flow direction with regard to the first cooling device. The third cooling device is disposed at the upstream side in the air flow direction with regard to the second cooling device. The air pipe connects the engine and the third cooling device. The air pipe is disposed so as to pass above the first cooling device and the second cooling device. The blocking member closes off the periphery of a space between the first cooling device and the second cooling device. The blocking member includes an opening. The cover member is configured to open and close the opening.

A work vehicle according to a second aspect of the present invention is the work vehicle according to the first aspect where a distance between the first cooling device and the second cooling device is larger than the thickness of the first cooling device in the air flow direction or the thickness of the second cooling device in the air flow direction.

A work vehicle according to a third aspect of the present invention is the work vehicle according to the first aspect where a distance between the first cooling device and the second cooling device is equal to or more than the sum of the thickness of the first cooling device and the thickness of the second cooling device in the air flow direction.

A work vehicle according to a fourth aspect of the present invention is the work vehicle according to the first aspect where the cover member is disposed above the space between the first cooling device and the second cooling device.

A work vehicle according to a fifth aspect of the present invention is the work vehicle according to the fourth aspect where a portion of the cover member is positioned directly below the air pipe.

A work vehicle according to a sixth aspect of the present invention is the work vehicle according to any of the first to the fifth aspects where a hydraulic pump, a hydraulic actuator, and an oil cooler are provided. The hydraulic pump is driven using the engine. The hydraulic actuator is driven using hydraulic fluid which is discharged from the hydraulic pump. The oil cooler cools the hydraulic fluid. The first cooling device is a first core of the oil cooler. The second cooling device is a second core of the oil cooler. The space between the first core and the second core is tightly closed.

A work vehicle according to a seventh aspect of the present invention is the work vehicle according to the sixth aspect where a radiator which cools coolant of the engine is further provided. The radiator is disposed to be adjacent to the oil cooler in a direction which is perpendicular to the air flow direction.

A work vehicle according to an eighth aspect of the present invention is the work vehicle according to the seventh aspect where the thickness of the oil cooler in the air flow direction is larger than the thickness of the radiator in the air flow direction.

A work vehicle according to a ninth aspect of the present invention is the work vehicle according to the eighth aspect where a fixing frame is further provided. The fixing frame fixes the oil cooler and the radiator to each other. The fixing frame includes a first fixing section and a second fixing section. The radiator is fixed to the first fixing section. The oil cooler is fixed to the second fixing section. The second fixing section has a shape which protrudes more than the first fixing section in a direction which is parallel to the air flow direction.

A work vehicle according to a tenth aspect of the present invention is the work vehicle according to the sixth aspect where the third cooling device is an after cooler.

In the working vehicle according to the first aspect of the present invention, it is possible to insert a nozzle of a cleaning device through the opening due to the opening being opened by moving the cover member. Due to this, it is possible to clean the space between the first cooling device and the second cooling device even without removing the first cooling device and the second cooling device from the vehicle body. Due to this, it is possible to easily perform cleaning of the cooling device. In addition, it is possible to prevent adverse effects on engine performance by cleaning work since it is possible to clean without removing the air pipe.

In the working vehicle according to the second aspect of the present invention, it is possible to more easily perform the cleaning of the cooling device since the gap between the first cooling device and the second cooling device is wide.

In the working vehicle according to the third aspect of the present invention, it is possible to more easily perform the cleaning of the cooling device since the gap between the first cooling device and the second cooling device is wide.

In the working vehicle according to the fourth aspect of the present invention, it is possible to perform the cleaning by inserting a nozzle of a cleaning device in the space between the first cooling device and the second cooling device from above.

In the working vehicle according to the fifth aspect of the present invention, a portion of the cover member closes off the opening directly below the air pipe. Accordingly, maintenance of the blocking member is easy since it is not necessary to dispose the blocking member directly below the air pipe.

In the working vehicle according to the sixth aspect of the present invention, it is possible to easily clean the space between the first core and the second core of the oil cooler.

In the working vehicle according to the seventh aspect of the present invention, clean air flows into both the radiator and the oil cooler compared to a case where the radiator and the oil cooler are disposed to line up in the air flow direction. As a result, it is possible to improve the cooling ability of the radiator and the oil cooler.

In the working vehicle according to the eighth aspect of the present invention, it is possible to widen the gap between the first core and the second core of the oil cooler.

In the working vehicle according to the ninth aspect of the present invention, it is possible to integrate the oil cooler and the radiator which have different shapes using the fixing frame.

In the working vehicle according to the tenth aspect of the present invention, the after cooler is disposed more to the upstream side in the air flow direction than the first cooling device and the second cooling device. As a result, it is possible to improve the cooling ability of the after cooler. In addition, it is possible to perform cleaning of the first cooling device and the second cooling device without removing the air pipe which connects the after cooler and the engine.

DETAILED DESCRIPTION OF THE EMBODIMENTS

Figure 1:
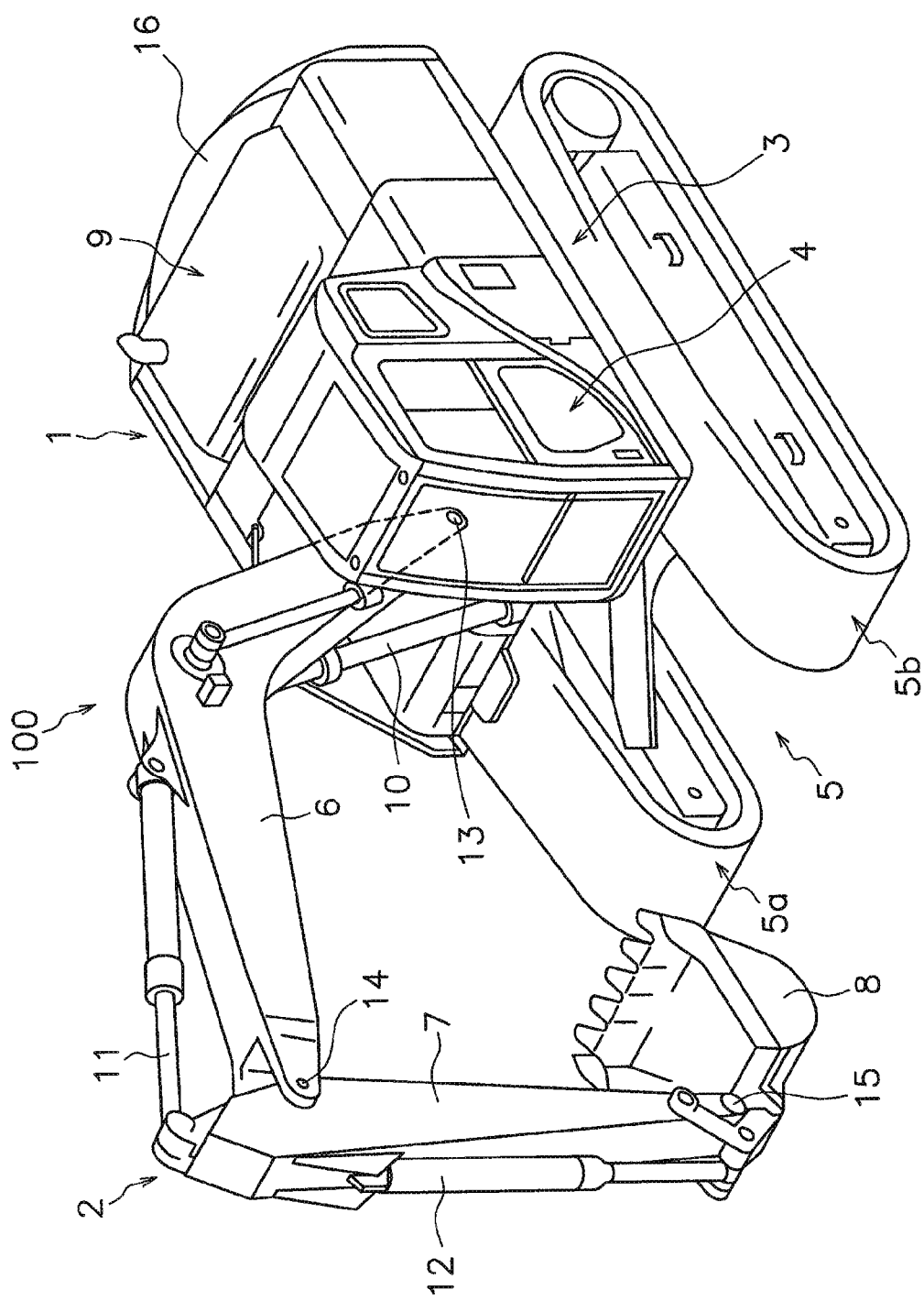
FIG. 1 is a perspective view of a work vehicle according to an embodiment of the present invention.

Below, a work vehicle according to an embodiment of the present invention will be described with reference to the drawings. FIG. 1 is a perspective view of a work vehicle 100. The work vehicle 100 is a hydraulic shovel. The work vehicle 100 has a vehicle body 1 and a work implement 2. The vehicle body 1 has a revolving body 3 and a movement device 5. The revolving body 3 is provided to be able to revolve using a hydraulic motor which is not shown in the diagram. The revolving body 3 has a cab 4, an engine room 9, and a counter weight 16. The cab 4 is placed on a front portion of the revolving body 3. The engine room 9 is disposed at the rear of the cab 4. The counter weight 16 is mounted at the rear of the engine room 9. The movement device 5 has crawler tracks 5a and 5b, and the work vehicle 100 moves due to rotation of the crawler tracks 5a and 5b.

The work implement 2 is attached to the front portion of the vehicle body 1, and has a boom 6, an arm 7, and a bucket 8. A base end portion of the boom 6 is attached to the front portion of the vehicle body 1 via a boom pin 13 so as to be able to swing. A base end portion of the arm 7 is attached to a tip end portion of the boom 6 via an arm pin 14 so as to be able to swing. The tip end portion of the arm 7 is attached to the bucket 8 via a bucket pin 15 to be able to swing. The work implement 2 has a boom cylinder 10, an arm cylinder 11, and a bucket cylinder 12. The boom cylinder 10, the arm cylinder 11, and the bucket cylinder 12 are driven using hydraulic fluid which is discharged from a hydraulic pump 17.

Figure 2:
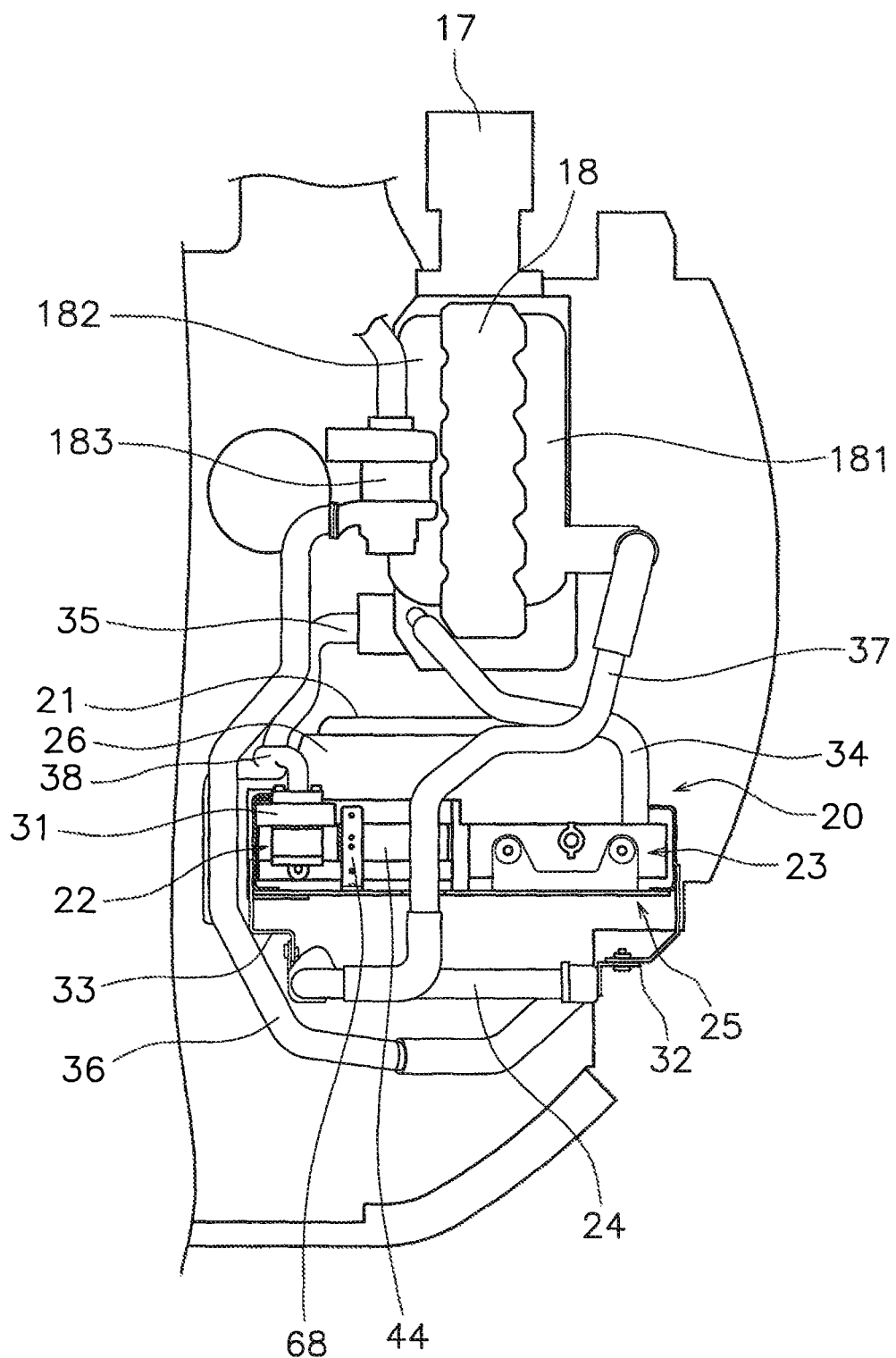
FIG. 2 is a plan view illustrating an apparatus which is disposed inside an engine room.
Figure 3:
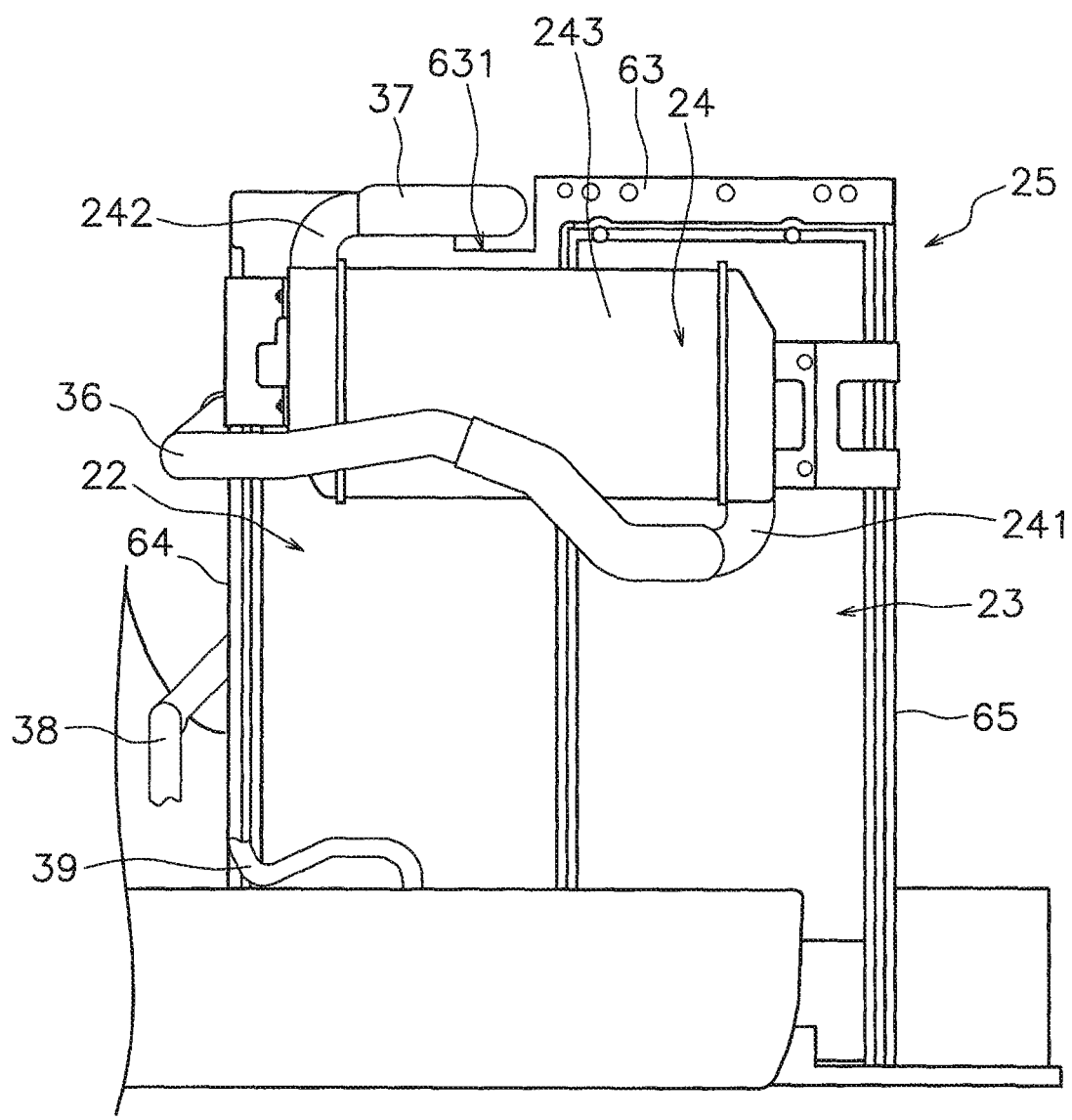
FIG. 3 is a side view illustrating an apparatus which is disposed inside an engine room.

FIG. 2 is a plan view illustrating an apparatus which is disposed inside the engine room 9. The leftward direction on the paper in FIG. 2 corresponds to the front of the work vehicle 100. The rightward direction on the paper in FIG. 2 corresponds to the rear of the work vehicle 100. In the embodiment, front and rear have the meaning of front and rear of the work vehicle 100. FIG. 3 is a side view illustrating an apparatus which is disposed inside the engine room 9. As shown in FIG. 2, an engine 18, a hydraulic pump 17, and a cooling unit 20 are disposed inside the engine room 9. The engine 18 has a suction manifold 181, an exhaust manifold 182, and a supercharger 183. The hydraulic pump 17 discharges hydraulic fluid by being driven using the engine 18. The hydraulic fluid which is discharged from hydraulic pump 17 is supplied to the hydraulic actuators such as the boom cylinder 10, the arm cylinder 11, and the bucket cylinder 12.

The cooling unit 20 is disposed on the side of the engine 18. The cooling unit has a cooling fan 21. The cooling fan 21 generates a flow of air which passes through the cooling unit 20 inside the engine room 9. The flow of air inside the engine room 9 flows along the vehicle width direction. The flow of air flows from the cooling unit 20 toward the engine 18. Accordingly, the cooling unit 20 is disposed inside the engine room 9 at the upstream side in the air flow direction with regard to the engine 18. In the present embodiment, the "upstream side" has the meaning of the upstream side in the air flow direction inside the engine room 9. In addition, the "downstream side" has the meaning of the downstream side in the air flow direction inside the engine room 9. The cooling unit 20 has an oil cooler 22, a radiator 23, an after cooler 24, a fixing frame 25, and a shroud 26.

The oil cooler 22 cools the hydraulic fluid. The oil cooler 22 is configured so that it is possible for air to flow through. The oil cooler 22 is disposed to the rear of the cab 4 described above. The oil cooler 22 has an oil outlet section 31 and an oil inlet section which is not shown in the diagram. The oil outlet section 31 is provided in an upper portion of the oil cooler 22. The oil inlet section is provided in a lower portion of the oil cooler 22.

The radiator 23 cools coolant of the engine 18. The radiator 23 is configured so that it is possible for air to pass through. The radiator 23 is disposed to be adjacent to the oil cooler 22 in a direction which is perpendicular to the air flow direction. Specifically, the radiator 23 is disposed to be adjacent to the oil cooler 22 in the front and rear direction of the vehicle. The radiator 23 is disposed to the rear of the oil cooler 22.

The after cooler 24 is disposed at the upstream side of the oil cooler 22 and the radiator 23. The after cooler 24 is fixed to the fixing frame 25 using a first bracket 32 and a second bracket 33. The after cooler 24 is disposed to be separated from the oil cooler 22 and the radiator 23 in a direction which is parallel to the air flow direction. As shown in FIG. 3, the height dimension of the after cooler 24 is smaller than the height dimension of the oil cooler 22 and the height dimension of the radiator 23. A base portion of the after cooler 24 is disposed above the base portions of the oil cooler 22 and the radiator 23. The after cooler 24 is disposed to oppose the upper portions of the oil cooler 22 and the radiator 23. In addition, the after cooler 24 has an inlet section 241, an outlet section 242, and a body section 243. The inlet section 241 is connected to a lower surface of the body section 243. The outlet section 242 is connected to an upper surface of the body section 243.

The fixing frame 25 fixes the oil cooler 22 and the radiator 23 to each other. The fixing frame 25 will be described in detail later. As shown in FIG. 2, the shroud 26 is disposed at the downstream side of the oil cooler 22 and radiator 23. The cooling fan 21 described above is disposed inside the shroud 26.

As shown in FIG. 2, a first radiator hose 34, a second radiator hose 35, an after cooler inlet pipe 36, an after cooler outlet pipe 37, and an oil cooler outlet pipe 38 are disposed inside the engine room 9. In addition, as shown in FIG. 3, an oil cooler inlet pipe 39 is disposed inside the engine room 9. Coolant for cooling the engine 18 flows through each of the first radiator hose 34 and the second radiator hose 35. The first radiator hose 34 and the second radiator hose 35 are each connected to the engine 18 and the radiator 23. The first radiator hose 34 and the second radiator hose 35 each extend from the engine 18 toward the radiator 23 and are connected to the surface at the downstream side of the radiator 23.

The after cooler inlet pipe 36 connects the engine 18 and the after cooler 24. Specifically, the after cooler inlet pipe 36 connects the supercharger 183 and the inlet section 241 of the after cooler 24. The air, which is sent from the supercharger 183 to the after cooler 24, flows in the after cooler inlet pipe 36. The after cooler inlet pipe 36 is disposed so as to pass in front of the cooling unit 20. The after cooler outlet pipe 37 connects the engine 18 and the after cooler 24. Specifically, the after cooler outlet pipe 37 connects the outlet section 242 of the after cooler 24 and the suction manifold 181. The air, which is sent from the after cooler 24 to the suction manifold 181, flows in the after cooler outlet pipe 37. The after cooler outlet pipe 37 is disposed so as to pass above the oil cooler 22.

The oil cooler inlet pipe 39 is connected to an oil inlet section (not shown in the diagram). The hydraulic fluid, which is sent from the oil cooler 22 to a hydraulic fluid tank which is not shown in the diagram, flows in the oil cooler inlet pipe 39. The oil outlet pipe 38 is connected to the oil outlet section 31. The hydraulic fluid, which is sent from the hydraulic cylinders 10, 11 and 12 to the oil cooler 22, flows in the oil outlet pipe 38.

Figure 4:
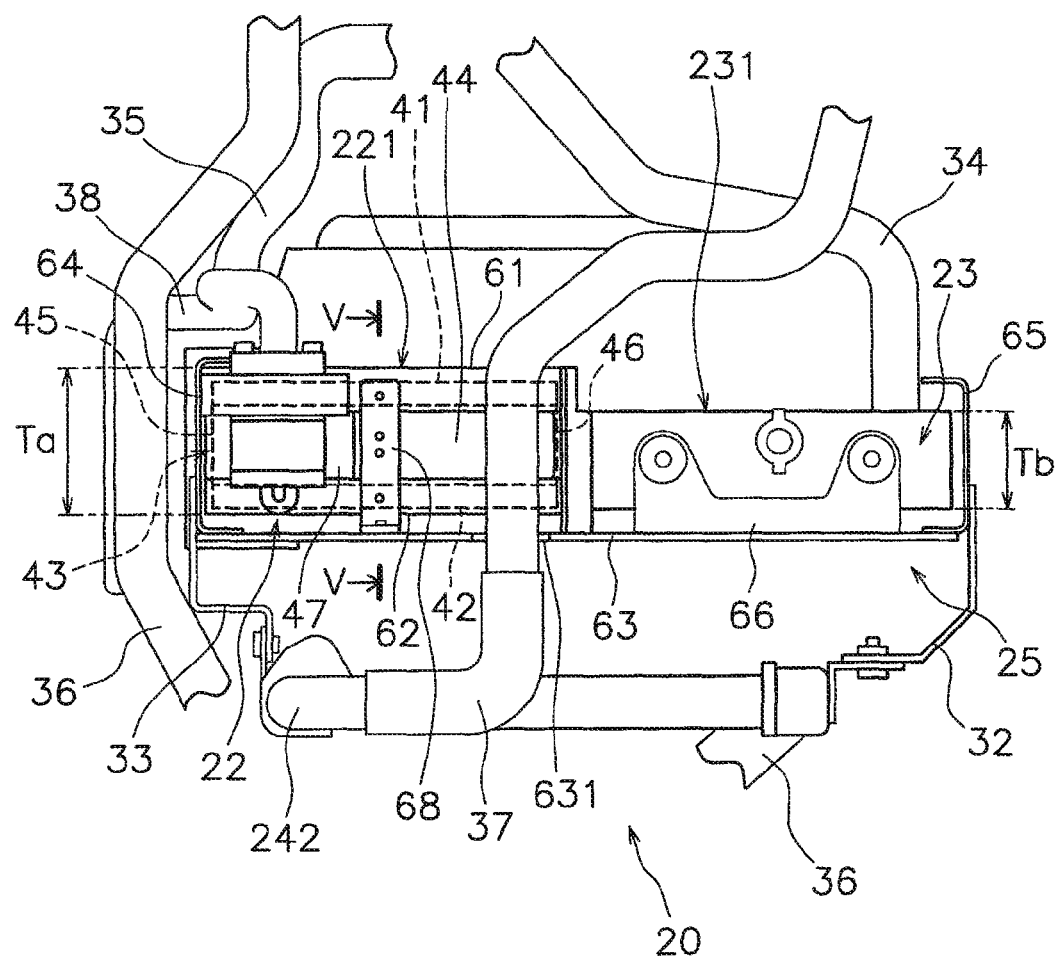
FIG. 4 is a plan view of a cooling unit.

Next, the configuration of the cooling unit 20 will be described in detail. FIG. 4 is a plan view of the cooling unit 20. As shown in FIG. 4, a thickness Ta in the air flow direction in the oil cooler 22 is larger than a thickness Tb in the air flow direction in the radiator 23. As a result, a surface 221 in the downstream side of the oil cooler 22 is disposed to protrude more to the downstream side than a surface 231 in the downstream side of the radiator 23. As shown in FIG. 4, the oil cooler 22 has a first core 41, a second core 42, a blocking member 43, and a cover member 44.

Figure 5:
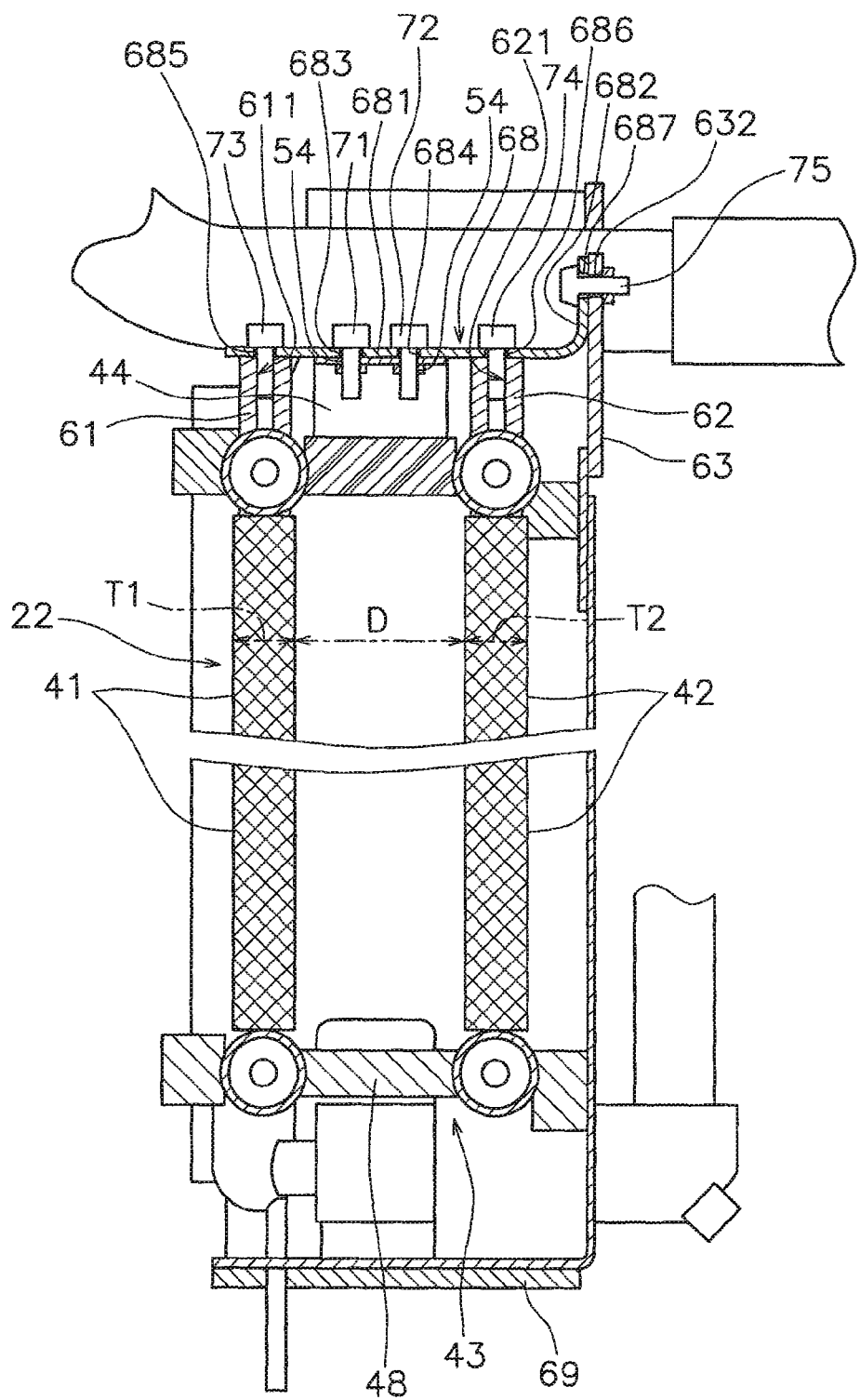
FIG. 5 is a cross sectional view along V-V in FIG. 4.

The first core 41 has a shape of a flat board which is perpendicular to the air flow direction. The second core 42 has a shape of a flat board which is perpendicular to the air flow direction. The second core 42 is disposed at the upstream side of the air flow direction with regard to the first core 41. FIG. 5 is across sectional view along V-V in FIG. 4. As shown in FIG. 5, a distance D between the first core 41 and the second core 42 is larger than a thickness T1 of the first core 41 in the air flow direction. In addition, the distance D between the first core 41 and the second core 42 is larger than a thickness T2 of the second core 42 in the air flow direction. Furthermore, the distance D between the first core 41 and the second core 42 is equal to or more than the sum of the thickness T1 of the first core 41 and the thickness T2 of the second core T2 in the air flow direction. That is, $D \geq T1+T2$.

Figure 6:
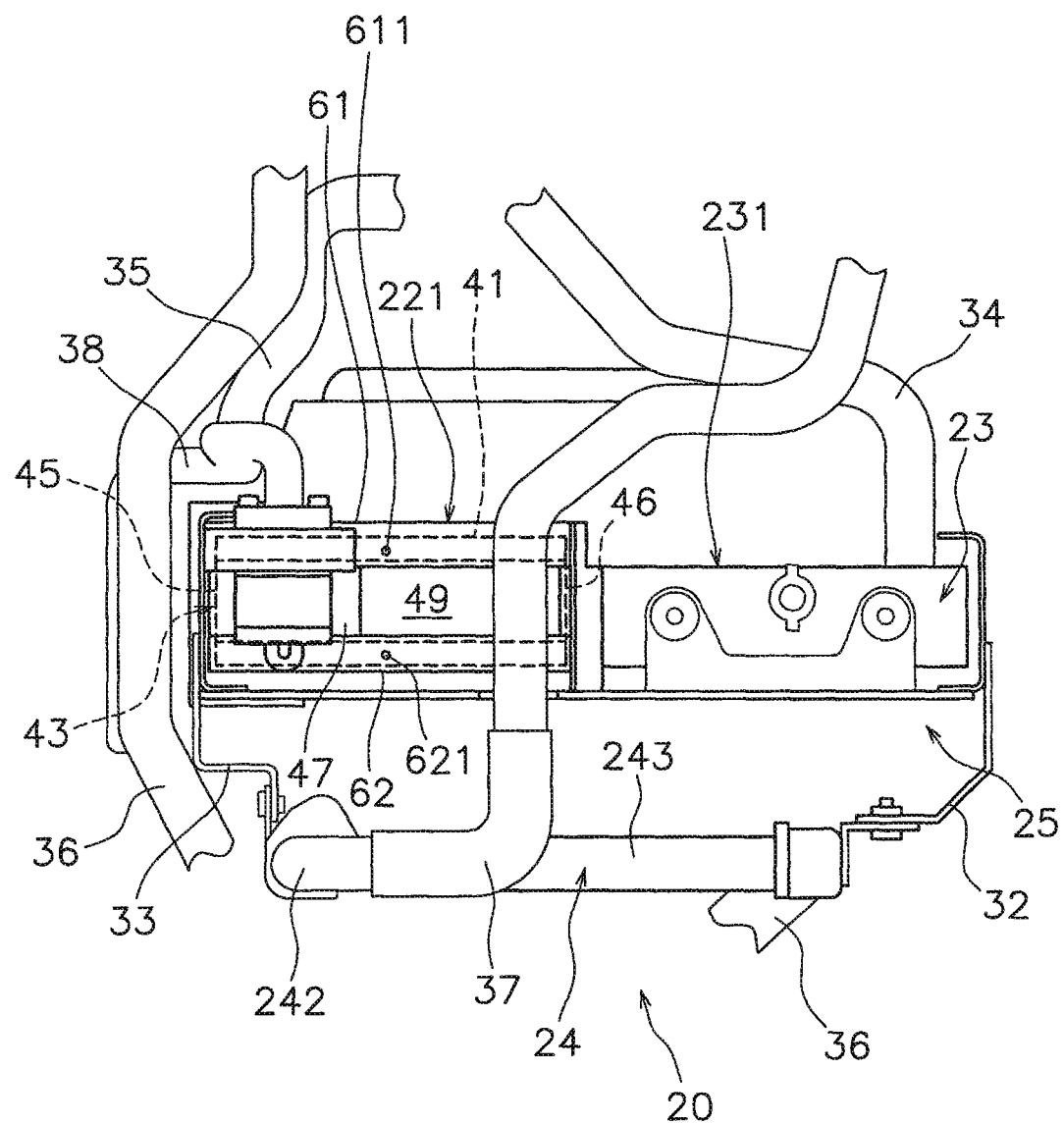
FIG. 6 is a plan view illustrating a cooling unit in a state where a cover member is removed from an oil cooler.

The blocking member 43 closes off the periphery of the space between the first core 41 and the second core 42. That is, the blocking member 43 tightly closes the space between the first core 41 and the second core 42. As shown in FIG. 4, the blocking member 43 has a first side surface section 45, a second side surface section 46, and an upper surface section 47. In addition, as shown in FIG. 5, the blocking member 43 has a bottom surface section 48. The first side surface section 45 closes off one side of a space in the direction which is perpendicular to the air flow direction in the space between the first core 41 and the second core 42. Specifically, the first side surface section 45 closes off the front of the space between the first core 41 and the second core 42. The second side surface section 46 closes off the other side of the space in the direction which is perpendicular to the air flow direction in the space between the first core 41 and the second core 42. Specifically, the second side surface section 46 closes off the rear of the space between the first core 41 and the second core 42. The bottom surface section 48 closes off below the space between the first core 41 and the second core 42. The upper surface section 47 closes off above the space between the first core 41 and the second core 42. Here, as shown in FIG. 6, an opening 49 is provided in the upper surface section 47. FIG. 6 is a plan view illustrating the cooling unit 20 in a state where the cover member 44 has been removed from the oil cooler 22.

The cover member 44 is provided so as to be able to open and close the opening 49. The cover member 44 is attached to the oil cooler 22 so as to be able to be attached and detached. The cover member 44 is disposed above the space between the first core 41 and the second core 42 in a state of being attached to the oil cooler 22. A portion of the cover member 44 is positioned directly below the after cooler outlet pipe 37.

Figure 7:
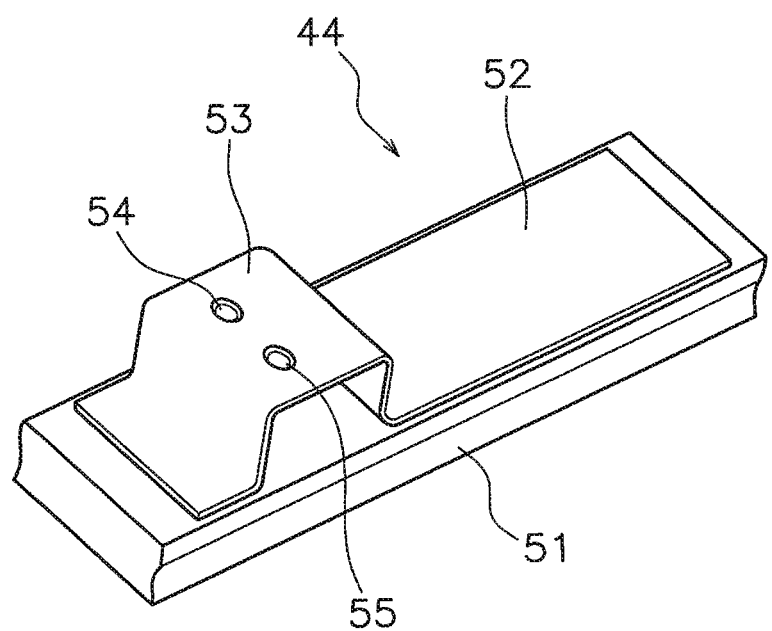
FIG. 7 is a perspective view of a cover member.

FIG. 7 is a perspective view of the cover member 44. As shown in FIG. 7, the cover member 44 has a seal member 51 and a support member 52. As shown in FIG. 5, the seal member 51 tightly closes between the first core 41 and the second core 42 by being disposed between the first core 41 and the second core 42. The seal member 51 is formed from a material which is elastic such as rubber. The support member 52 is fixed to the upper surface of the seal member 51. The support member 52 has a convex section 53 which protrudes upward. Holes 54 and 55 which a bolt passes through are provided in the upper surface of the convex section 53.

As shown in FIG. 4 and in FIG. 5, the oil cooler 22 has a first frame section 61 and a second frame section 62. The first frame section 61 and the second frame section 62 each extend in a direction which is perpendicular to the air flow direction. The first frame section 61 is disposed above the first core 41. As shown in FIG. 5 and in FIG. 6, a hole 611 which a bolt passes through is formed in the first frame section 61. The second frame section 62 is disposed above the second core 42. A hole 621 which a bolt passes through is formed in the second frame section 62.

As shown in FIG. 3 and in FIG. 4, the fixing frame 25 has an upper frame section 63, a first side frame section 64, and a second side frame section 65. The upper frame section 63 has a shape of a board which extends in the direction which is perpendicular to the air flow direction. As shown in FIG. 3, the upper frame section 63 is disposed above the oil cooler 22 and the radiator 23. The upper frame section 63 is disposed to span between the oil cooler 22 and the radiator 23. The upper frame section 63 includes a concave section 631. The after cooler outlet pipe 37 is disposed to pass through the concave section 631. As shown in FIG. 4, the upper frame section 63 is disposed along an edge on the upstream side on the upper surface of the oil cooler 22 and the radiator 23.

The radiator 23 is fixed to the upper frame section 63 via a radiator bracket 66. The radiator bracket 66 is disposed above the radiator 23 and is fixed to the upper surface of the radiator 23. In addition, the radiator bracket 66 is fixed to the upper frame section 63. Due to this, the upper portion of the radiator 23 is fixed to the fixing frame 25.

The first side frame section 64 and the second side frame section 65 have the shape of a board which extends in an up and down direction. The first side frame section 64 is disposed to be adjacent to the oil cooler 22 in the direction which is perpendicular to the air flow direction. Specifically, the first side frame section 64 is disposed in front of the oil cooler 22. The second side frame section 65 is disposed to be adjacent to the radiator 23 in the direction which is perpendicular to the air flow direction. Specifically, the second side frame section 65 is disposed at the rear of the radiator 23.

As shown in FIG. 4 and in FIG. 5, the cover member 44 is attached to the fixing frame 25 via a bracket 68. As shown in FIG. 5, the bracket 68 is a shape which is bent into an L shape. The bracket 68 has a planar section 681 and a wall section 682. The planar section 681 is disposed across between the first frame section 61 and the second frame section 62. That is, the planar section 681 is disposed to span between the first core 41 and the second core 42. Holes 683 and 684 are formed in the planar section 681 at positions which correspond to the holes 54 and 55 in the cover member 44. The cover member 44 is fixed to the bracket 68 by a bolt 71 passing through the hole 54 in the cover member 44 and the hole 683 in the bracket 68. In addition, the cover member 44 is fixed to the bracket 68 by a bolt 72 passing through the hole 55 in the cover member 44 and the hole 684 in the bracket 68. A hole 685 is formed in the planar section 681 in a position which corresponds to the hole 611 of the first frame section 61. A hole 686 is formed in a position which corresponds to the hole 621 of the second frame section 62. The bracket 68 is fixed to the first frame section 61 of the oil cooler 22 by a bolt 73 passing through the hole 611 and the hole 685. The bracket 68 is fixed to the second frame section 62 of the oil cooler 22 by a bolt 74 passing through the hole 621 and the hole 686. A hole 687 is formed in the wall section 682. A hole 632 is formed in the upper frame section 63 described above in a position which corresponds to the hole 687 in the wall section 682. The bracket 68 is fixed to the upper frame section 63 by a bolt 75 passing through the hole 687 and the hole 632.

Figure 8:
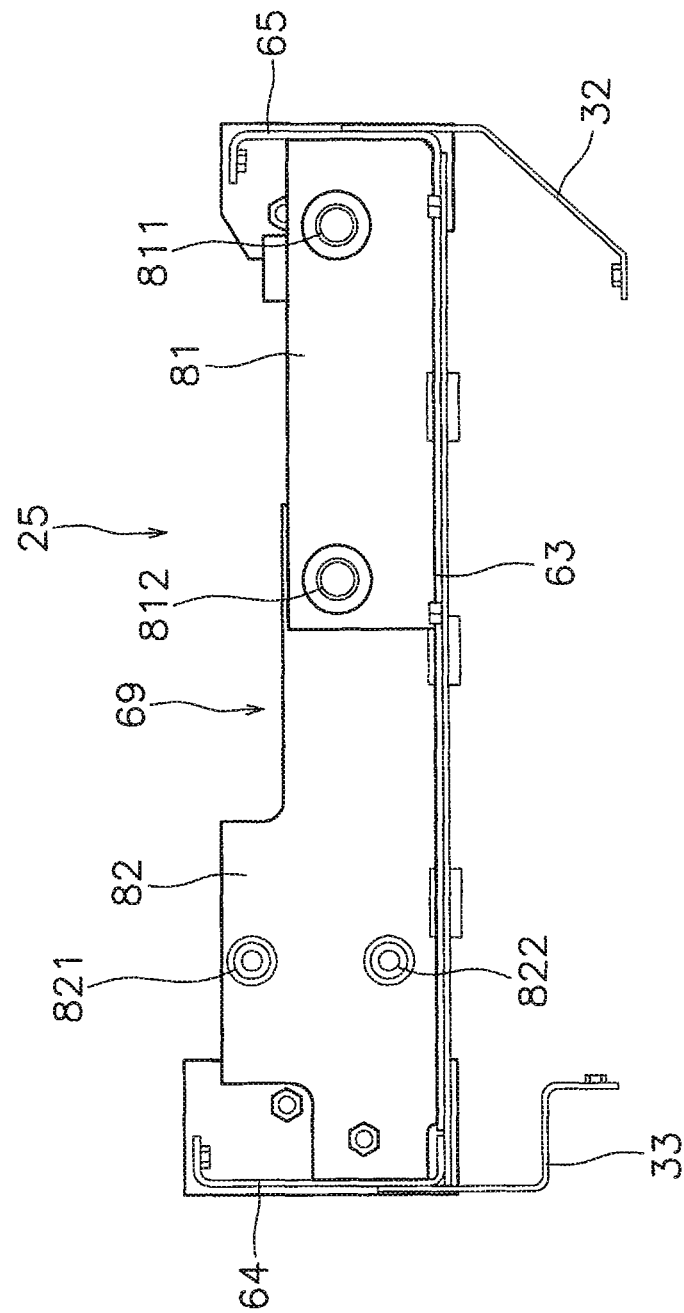
FIG. 8 is a plan view of a fixing frame.

As shown in FIG. 5, the fixing frame 25 has a base frame section 69. The base frame section 69 has a shape of a board which extends in the direction which is perpendicular to the air flow direction. The base frame section 69 is disposed below the oil cooler 22 and the radiator 23. The base frame section 69 is disposed to span between the oil cooler 22 and the radiator 23. FIG. 8 is a plan view of the fixing frame 25. As shown in FIG. 8, the base frame section 69 has a first fixing section 81 and a second fixing section 82. The radiator 23 is fixed to the first fixing section 81. Holes 811 and 812 are formed in the first fixing section 81. The radiator 23 is fixed to the first fixing section 81 by a pin which is provided in the base section of the radiator 23 passing through the holes 811 and 812. The oil cooler 22 is fixed to the second fixing section 82. Holes 821 and 822 are formed in the second fixing section 82. The oil cooler 22 is fixed by a pin which is provided in the base section of the oil cooler 22 passing through the holes 821 and 822. The second fixing section 82 has a shape which protrudes in the direction which is parallel of the air flow direction more than the first fixing section 81. That is, the first fixing section 81 and the second fixing section 82 are a shape which corresponds to the thickness of the radiator 23 and the thickness of the oil cooler 22. Specifically, the second fixing section 82 is a shape which protrudes more to the downstream side than the first fixing section 81.

In the work vehicle 100 according to the present embodiment, it is possible for the cover member 44 to be removed from the oil cooler 22 by removing the bolts 73, 74 and 75 shown in FIG. 5. Due to this, as shown in FIG. 6, the opening 49 is opened. During cleaning, it is possible to perform cleaning of the oil cooler 22 by inserting the nozzle of the cleaning device through the opening 49. Due to this, even if the cooling unit 20 is not removed from the vehicle body 1, it is possible to clean the space between the first core 41 and the second core 42 of the oil cooler 22. Due to this, it is possible to easily perform the cleaning of the oil cooler 22. In addition, since it is possible to clean the oil cooler 22 even without removing the after cooler outlet pipe 37, it is possible to prevent foreign matter from penetrating the after cooler outlet pipe 37 in the cleaning work. Due to this, it is possible to prevent adverse effects on engine performance.

The distance D between the first core 41 and the second core 42 is larger than the thickness T1 of the first core 41, and in addition, is larger than the thickness T2 of the second core 42. Furthermore, the distance D between the first core 41 and the second core 42 is equal to or more than the sum of the thickness T1 of the first core 41 and the thickness T2 of the second core 42. In this manner, since there is a wide gap between the first core 41 and the second core 42, it is possible to more easily perform the cleaning of the oil cooler 22.

Since the opening 49 is positioned above the space between the first core 41 and the second core 42, it is possible to perform cleaning by a nozzle of a cleaning device being inserted into the space between the first core 41 and the second core 42 from above. As a result, even if the space in front of the cooling unit 20 is narrow, it is possible to easily perform the cleaning of the cooling unit 20 from above.

A portion of the cover member 44 closes off the opening 49 directly below the after cooler outlet pipe 37. Accordingly, since it is not necessary to dispose the blocking member 43 directly below the after cooler outlet pipe 37, the maintenance of the blocking member 43 is easy.

By widening the gap between the first core 41 and the second core 42, the thickness Ta of the oil cooler 22 and the thickness Tb of the radiator 23 are different. In this manner, it is possible to integrate the oil cooler 22 and the radiator 23 which have different shapes using the fixing frame 25 as described above.

Above, an embodiment of the present invention has been described, but the present invention is not limited to the embodiment described above and various modifications are possible within the scope which does not depart from the gist of the invention.

In the embodiment described above, the hydraulic shovel is given as an example of the work vehicle 100, but the present invention may be applied to other types of work vehicles such as a wheel loader or a bulldozer.

In the embodiment described above, the hydraulic cylinders of the work implement such as the boom cylinder 10, the arm cylinder 11, the bucket cylinder 12 are given as examples of the hydraulic actuator, but the hydraulic actuator may be other devices such as a hydraulic motor for movement or a hydraulic motor for revolving.

In the embodiment described above, the cover member 44 opens and closes the opening 49 which is between the first core 41 and the second core 42 of the oil cooler 22, but the cover member 44 may open and close an opening which is formed between another cooling devices. For example, the cover member may open and close an opening between the radiator and the oil cooler in a case where the radiator and the oil cooler are disposed to be spaced with a gap in the air flow direction. Due to this, it is possible to easily clean the space between the radiator and the oil cooler.

In the embodiment described above, the oil cooler 22, the radiator 23, and the after cooler 24 are given as an example of the cooling device, but cooling devices which are types different to this may be used.

In the embodiment described above, the air flow direction inside the engine room 9 is the same as the vehicle width direction, but may be the front and back direction of the vehicle body.

The cover member 44 is disposed above the space between the first core 41 and the second core 42, but may be disposed in a direction other than in an upward direction. In the embodiment described above, the radiator 23 is disposed in a position which is adjacent to the oil cooler 22 in the direction which is perpendicular to the air flow direction, but may be disposed in a position which is different to this. For example, the radiator 23 may be disposed to be adjacent to the oil cooler 22 in the air flow direction.

The thickness of the oil cooler 22 may be equal to or less than the thickness of the radiator 23. Here, since the gap between the first core 41 and the second core 42 is widened, it is preferable that the thickness of the oil cooler 22 be larger than the thickness of the radiator 23 as in the embodiment described above.

The shape of the fixing frame 25 is not limited to the shape in the embodiment described above. For example, the second fixing section 82 may have a shape which protrudes more to the upstream side than the first fixing section 81.

The distance D between the first core 41 and the second core 42 may be smaller than the sum of the thickness T1 of the first core 41 and the thickness T2 of the second core 42. Alternatively, the distance D between the first core 41 and the second core 42 may be equal to or less than the thickness T1 of the first core 41, or alternatively, the distance D between the first core 41 and the second core 42 may be equal to or less than the thickness T2 of the second core 42. Here, in order for the nozzle to be inserted easily, it is desirable for the distance D between the first core 41 and the second core 42 to be wide as described above.

According to the present invention, it is possible to provide a work vehicle where it is possible for cleaning of a cooling device to be easily performed and it is possible for adverse effects by cleaning work on engine performance to be prevented.

The invention claimed is:

1. A work vehicle comprising:
    a vehicle body including an engine room;
    an engine disposed inside the engine room;
    a first cooling device disposed in the engine room at an upstream side in an air flow direction with respect to the engine;
    a second cooling device disposed at the upstream side in the air flow direction with respect to the first cooling device;
    a third cooling device disposed at the upstream side in the air flow direction with respect to the second cooling device;
    a first air pipe connecting the engine and the third cooling device, the first air pipe passing above the first cooling device and the second cooling device;
    a second air pipe connected to the third cooling device, and disposed in a position adjacent to the first cooling device and the second cooling device in a direction perpendicular to the air flow direction in a horizontal direction;
    a blocking member closing off periphery of a space between the first cooling device and the second cooling device, the blocking member including an opening; and
    a cover member configured to selectively open and close the opening, the cover member being disposed above the space between the first cooling device and the second cooling device.

2. The work vehicle according to claim 1, wherein a distance between the first cooling device and the second cooling device is larger than either a thickness of the first cooling device in the air flow direction or a thickness of the second cooling device in the air flow direction.

3. The work vehicle according to claim 1, wherein a distance between the first cooling device and the second cooling device is equal to or more than a sum of a thickness of the first cooling device and a thickness of the second cooling device in the air flow direction.

4. The work vehicle according to claim 1 wherein a portion of the cover member is positioned directly below the air pipe.

5. The work vehicle according to claim 1, further comprising:
    a hydraulic pump driven using the engine;
    a hydraulic actuator driven using hydraulic fluid discharged from the hydraulic pump; and
    an oil cooler for cooling the hydraulic fluid, the first cooling device being a first core of the oil cooler and the second cooling device being a second core of the oil cooler.

6. The work vehicle according to claim 5, further comprising:
    a radiator for cooling coolant of the engine, the radiator being disposed to be adjacent to the oil cooler in a direction perpendicular to the air flow direction in the horizontal direction.

7. The work vehicle according to claim 6, wherein a thickness of the oil cooler in the air flow direction is larger than a thickness of the radiator in the air flow direction.

8. The work vehicle according to claim 7, further comprising:
    a fixing frame fixing the oil cooler and the radiator to each other,
    the fixing frame including:
        a first fixing section to which the radiator is fixed; and
        a second fixing section to which the oil cooler is fixed, the second fixing section having a shape which protrudes more than the first fixing section in a direction parallel to the air flow direction.

9. The work vehicle according to claim 5, wherein the third cooling device is an after cooler.

10. The work vehicle according to claim 2, further comprising:
    a hydraulic pump driven using the engine;
    a hydraulic actuator driven using hydraulic fluid discharged from the hydraulic pump; and an oil cooler for cooling the hydraulic fluid, the first cooling device being a first core of the oil cooler and the second cooling device being a second core of the oil cooler.

11. The work vehicle according to claim 10, further comprising:
a radiator for cooling coolant of the engine, the radiator being disposed to be adjacent to the oil cooler in a direction perpendicular to the air flow direction.

12. The work vehicle according to claim 10, wherein the third cooling device is an after cooler.

13. The work vehicle according to claim 3, further comprising:
a hydraulic pump driven using the engine;
a hydraulic actuator driven using hydraulic fluid discharged from the hydraulic pump; and
an oil cooler for cooling the hydraulic fluid, the first cooling device being a first core of the oil cooler and the second cooling device being a second core of the oil cooler.

14. The work vehicle according to claim 13, further comprising:
a radiator for cooling coolant of the engine, the radiator being disposed to be adjacent to the oil cooler in a direction perpendicular to the air flow direction.

15. The work vehicle according to claim 13, wherein the third cooling device is an after cooler.

16. The work vehicle according to claim 4, further comprising:
a hydraulic pump driven using the engine;
a hydraulic actuator driven using hydraulic fluid discharged from the hydraulic pump; and
an oil cooler for cooling the hydraulic fluid, the first cooling device being a first core of the oil cooler and the second cooling device being a second core of the oil cooler.

17. The work vehicle according to claim 16, further comprising:
a radiator for cooling coolant of the engine, the radiator being disposed to be adjacent to the oil cooler in a direction perpendicular to the air flow direction.

18. The work vehicle according to claim 5, wherein
a thickness of the first core of the oil cooler in the air flow direction is smaller than a thickness of the radiator in the air flow direction, and
a thickness of the second core of the oil cooler in the air flow direction is smaller than a thickness of the radiator in the air flow direction.

* * * * *